June 30, 1925.
M. J. TRUMBLE
GAS TRAP
Filed Oct. 24, 1923
1,544,286
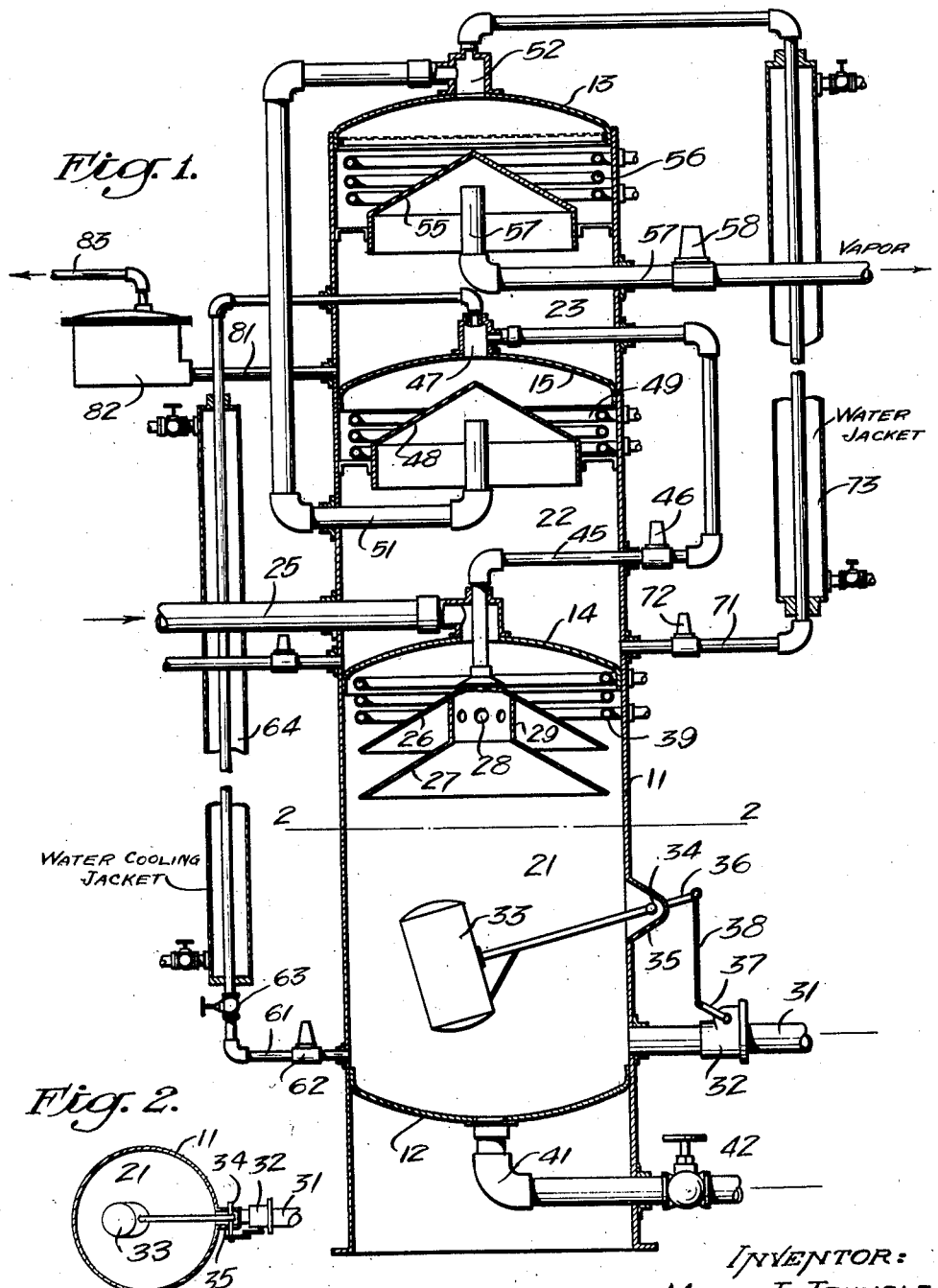

Patented June 30, 1925.

1,544,286

UNITED STATES PATENT OFFICE.

MILON J. TRUMBLE, OF LOS ANGELES, CALIFORNIA, ASSIGNOR TO TRUMBLE GAS TRAP CO., OF LOS ANGELES, CALIFORNIA, A CO-PARTNERSHIP CONSISTING OF MILON J. TRUMBLE, FRANCIS M. TOWNSEND AND ALFRED J. GUTZLER.

GAS TRAP.

Application filed October 24, 1923. Serial No. 670,445.

*To all whom it may concern:*

Be it known that I, MILON J. TRUMBLE, a citizen of the United States, residing at Los Angeles, in the county of Los Angeles, State of California, have invented a new and useful Gas Trap, of which the following is a specification.

My invention relates to gas traps such as are used in the oil industry for separating gas from oil.

Petroleum oil as found in nature is a complex mixture of hydrocarbons, some of which are gaseous at atmospheric temperatures and pressures. As found in the oil sands, all of the petroleum may be liquid due to its being under considerable pressure but as the oil is lifted by pumps and particularly where it flows naturally, the pressure decreases as the oil nears the surface of the ground. The release in pressure allows an expansion of the gaseous portion of the oil and where the oil contains considerable gas there results a foamy mixture of oil and gas.

Since the oil and gas have different commercial destinations and uses, it is highly desirable that a perfect separation thereof be effected. In other words, it is desirable to separate the gas from the oil for the purpose of saving the gas which would otherwise escape from the oil during transportation and storage; and it is desirable that no oil be carried over in the separated gas since this oil would naturally be lost if so carried over.

In many flowing wells, producing large quantities of gas, especially where the oil is warm, as is often the case, it is often a difficult matter to obtain a perfect separation. In such cases the large volume of gas flowing from the gas trap tends to pick up and carry particles of oil from the foam formed in the trap and the losses of oil from this source may be considerable.

It is an object of my invention to provide a gas trap which will separate large volumes of gas from oil and which will be so constructed that substantially no oil will be carried over with the gas.

It is a further object of my invention to provide means by which a portion of the oil separated will be used to catch and retain any particles of oil carried by the flowing stream of gas leaving the trap.

It is a further object of my invention to incorporate in a gas trap means for cooling the oil and thus improving the separation.

Further objects and advantages will be made evident hereinafter.

Referring to the drawings which are for illustrative purposes only:

Fig. 1 is a side elevation partly in section of one embodiment of my invention.

Fig. 2 is a section on a plane represented by the line 2—2 of Fig. 1.

In the form of the invention shown, I provide a cylindrical shell 11 which has a tight bottom 12 and a tight top 13 and which is provided with a lower partition 14 and an upper partition 15. Between the bottom 12 and the partition 14 is a first expansion chamber 21. Immediately above the partition 14 is a second expansion chamber 22, and above the partition 15 is a third expansion chamber 23. The oil and gas, as it comes from the well a foamy mixture, is delivered through a pipe 25 through the partition 14, falling upon an upper cone 26 and being directed thereby against the inner walls of the chamber 21. Situated directly below the cone 26 is a cone 27, openings 28 being provided in the cylindrical member 29, connecting the cones 26 and 27. An oil outlet pipe 31 opens into the bottom of the first chamber 21, and has a valve 32 therein, which is opened and closed by means of a float 33 in this chamber. The float 33 is pivoted on a shaft 34 in an extension 35, this shaft projecting through the wall of the extension and carrying a lever 36 which operates a lever 37 on the valve 32, through a connection rod 38. The parts are so arranged that the valve is opened as the float 33 rises.

Situated in the top of the chamber 21, directly over the cone 26, is a water cooling coil 39, through which cold water is circulated. A blow-off pipe 41 provided with a valve 42 is provided in the bottom 12, this pipe being used to remove any mud or sediment which may collect in the bottom of the chamber 21.

Gas is taken from the chamber 21 from under the cones 26 and 27 by means of a pipe 45, which is provided with a pressure regulating valve 46. This gas is delivered through an opening 47 in the partition 15 onto a cone 48 in the chamber 22, cooling coils 49 are placed in the top of the chamber 22 and are fed with the cooling water from a source not shown. The gas delivered through the pipe 45 may be partly in the form of a foam which is delivered on the top of the cone 48 and allowed to flow downwardly thruogh the chamber 22. Gas is taken off from under the cone 48 by means of a pipe 51 and delivered through an opening 52 in the top 13 into the chamber 23. This gas may again contain some particles of oil which are projected onto a cone 55, cooling coils 56 being provided in the top of the chamber 23 and supplied with cooling water from a source not shown. Gas is taken from the space under the cone 55 by means of a gas outlet pipe 57 which is provided with a pressure regulating valve 58.

For the purpose of assisting in the separation of the froth from the gas, a pipe 61 is provided, this pipe being provided with a pressure regulating valve 62 and a manually operated valve 63. The pipe 61 passes through a water jacket 64, by means of which the oil is cooled, this oil being delivered through the opening 47 onto the cone 48. In a similar manner oil may be taken from the bottom of the chamber 22 through a pipe 71 having a regulating valve 72, this oil being passed through a water jacket 73 and delivered through the opening 52. Any oil collecting in the chamber 23 is delivered through a pipe 81 into a trap 82. The trap 82 may be a standard steam trap such as is commonly used for removing water of condensation from steam pipes, the trap operating to pass oil outwardly through a pipe 83 without allowing gas to pass through that pipe.

The method of operation of the invention is as follows:

The mixture of oil and gas in a foamy condition is delivered by the pipe 25 to the cone 26 and the froth or foam passes downwardly through the chamber 21. Some expansion takes place in this chamber and the gas released passes upwardly through the pipe 45 and is delivered on the cone 48. This gas carries with it particles of oil and froth. To assist in collecting this froth a small quantity of cold oil is passed through the pipe 61 onto the cone 48, this oil forming a thin film on the cone which is especially adapted to catch and retain any particles of oil in the gas. The separated gas is then passed through the pipe 51 onto the cone 55, which in turn is kept wet with oil from the pipe 71. The oil delivered through the pipes 61 and 71 is cooled by the water jacket to assist it in collecting the absorbing oil. Any oil collecting in the bottom of the third chamber 23 is automatically removed by means of the trap 82. The oil separated in the chamber 21 is automatically removed through the pipe 31 whenever a sufficient amount collects in the chamber 21 to leave the float 33 and opens the valve 32. By a suitable regulation of the various pressure regulating valves the expansion of the gas can be made gradual, the pressure in the chamber 21 being above the pressure in the chamber 22 and the pressure in the chamber 22 being above the pressure in the chamber 23. By a suitable regulation of the pressure regulating valve 58, the pressure in the chamber 23 may be held above atmospheric.

By the use of my invention, it is possible to separate the gas from the oil even when in the form of foamy mixtures.

I claim as my invention:

1. A gas trap comprising: walls forming a primary chamber; walls forming a secondary chamber independent of said primary chamber; means for introducing a mixture of oil and gas into said primary chamber; means for withdrawing gas from said primary chamber and introducing it into said secondary chamber; means for withdrawing oil from said primary chamber; means arranged to introduce a flow of oil from said primary chamber into said secondary chamber with said gas to break down foam carried with said gas; and means in said secondary chamber for separating from said gas any oil that may be carried therewith.

2. A gas trap comprising: walls forming a primary chamber; walls forming a secondary chamber independent of said primary chamber; means for introducing a mixture of oil and gas into said primary chamber; means for withdrawing gas from said primary chamber and introducing it into said secondary chamber; means for withdrawing oil from said primary chamber; means arranged to introduce a flow of oil from said primary chamber into said secondary chamber with said gas to break down foam carried with said gas; and means in said secondary chamber for separating from said gas any oil that may be carried therewith, said secondary chamber being maintained at a lower pressure than said primary chamber.

3. A gas trap comprising: walls forming a primary chamber; walls forming a secondary chamber independent of said primary chamber; means for introducing a mixture of oil and gas into said primary chamber; means in said primary chamber for finely dividing the mixture to allow the gas to escape from the oil; means for withdrawing the oil from said primary chamber; means for delivering the separated gas into said secondary chamber; means arranged to introduce a flow of oil from said primary chamber into said secondary chamber with said gas to break down foam carried with said gas; means in said secondary chamber for removing from the gas any oil carried therewith; means for withdrawing oil from said secondary chamber; and means for withdrawing gas from said chamber.

4. A gas trap comprising: walls forming a primary chamber; walls forming a secondary chamber independent of said primary chamber; means for introducing a mixture of oil and gas into said primary chamber; means in said primary chamber for finely dividing the mixture to allow the gas to escape from the oil; means for withdrawing the oil from said primary chamber; means for delivering the separated gas into said secondary chamber; means arranged to introduce a flow of oil from said primary chamber into said secondary chamber with said gas to break down foam carried with said gas; means in said secondary chamber for removing from the gas any oil carried therewith; means for withdrawing oil from said secondary chamber; and means for withdrawing gas from said chamber, said secondary chamber being at a lower pressure than said primary chamber.

5. In a separator of the character described, the combination of: means for separating gas and foam from the product of an oil well; walls forming a separating chamber; means for introducing said gas and foam into said separating chamber; and means for establishing a continuous flow of quiescent oil into said separating chamber in a manner to break down said foam and release the gas therefrom.

6. A separator as defined in claim 5, including means for flowing said foam and said quiescent oil over a surface.

7. A separator as defined in claim 5, including means for cooling said quiescent oil before its introduction into said separating chamber.

In testimony whereof, I have hereunto set my hand at Los Angeles, California, this 18th day of October, 1923.

MILON J. TRUMBLE.